(12) United States Patent
Baker et al.

(10) Patent No.: US 10,982,419 B2
(45) Date of Patent: Apr. 20, 2021

(54) ELECTRONIC PLUMBING FIXTURE FITTING INCLUDING FLOW SWITCH

(71) Applicant: Moen Incorporated, North Olmsted, OH (US)

(72) Inventors: Daniel W. Baker, Medina, OH (US); Harshil Parikh, North Olmsted, OH (US)

(73) Assignee: FB Global Plumbing Group LLC, North Olmsted, OH (US)

( * ) Notice: Subject to any disclaimer, the term of this patent is extended or adjusted under 35 U.S.C. 154(b) by 0 days.

(21) Appl. No.: 16/403,527

(22) Filed: May 4, 2019

(65) Prior Publication Data

US 2019/0338502 A1 Nov. 7, 2019

Related U.S. Application Data

(60) Provisional application No. 62/667,273, filed on May 4, 2018.

(51) Int. Cl.
- *E03C 1/05* (2006.01)
- *F16K 11/00* (2006.01)
- *E03C 1/02* (2006.01)

(52) U.S. Cl.
CPC .............. *E03C 1/057* (2013.01); *E03C 1/021* (2013.01); *F16K 19/006* (2013.01); *E03C 2001/026* (2013.01)

(58) Field of Classification Search
CPC ........ F16K 19/006; E03C 1/021; E03C 1/057; E03C 1/0408; E03C 2001/026

USPC ..................................................... 251/129.03
See application file for complete search history.

(56) References Cited

U.S. PATENT DOCUMENTS

| | | | |
|---|---|---|---|
| 5,070,220 A | 12/1991 | Glenn | |
| 5,139,044 A * | 8/1992 | Otten | A01G 25/16 137/80 |
| 5,536,395 A | 7/1996 | Kuennen et al. | |
| 5,868,311 A * | 2/1999 | Cretu-Petra | E03C 1/057 236/12.12 |
| 6,341,389 B2 * | 1/2002 | Philipps-Liebich | E03C 1/05 251/129.04 |
| 7,624,757 B2 * | 12/2009 | Schmitt | E03C 1/05 137/606 |
| 7,631,372 B2 | 12/2009 | Marty et al. | |
| 8,939,429 B2 | 1/2015 | Sawawski et al. | |
| 9,194,110 B2 | 11/2015 | Frick et al. | |
| 9,976,290 B2 | 5/2018 | Evans et al. | |
| 9,988,797 B2 | 6/2018 | Reeder et al. | |
| 2006/0137090 A1 | 6/2006 | Jeffries et al. | |

(Continued)

OTHER PUBLICATIONS

International Search Report for International App. No. PCT/US2019/030766 dated Jul. 10, 2019 (2 pages).

(Continued)

*Primary Examiner* — Matthew W Jellett
(74) *Attorney, Agent, or Firm* — Calfee, Halter & Griswold LLP

(57) ABSTRACT

The present invention provides an electronic plumbing fixture fitting, such as an electronic faucet, that includes an electronic valve, a mechanical valve, and a flow switch. The flow switch is used to determine if the mechanical valve is activated. The determination whether the mechanical valve is activated can be used to control the electronic valve.

20 Claims, 12 Drawing Sheets

(56) References Cited

U.S. PATENT DOCUMENTS

2016/0076233 A1   3/2016   Parikh et al.

OTHER PUBLICATIONS

Written Opinion of the International Searching Authority for International App. No. PCT/US20191030766 dated Jul. 10, 2019 (11 pages).
Author unknown, Neoperl—DW10-10 mm OD—Check Valve Cartridge—Spring Loaded, the check valve cartridge shown in this document is believed to have been publicly available prior to May 4, 2018 (1 page).
Author unknown, Neoperl—OF10-10 mm OD—Check Valve Insert—Spring Loaded, the check valve insert shown in this document is believed to have been publicly available prior to May 4, 2018 (1 page).

* cited by examiner

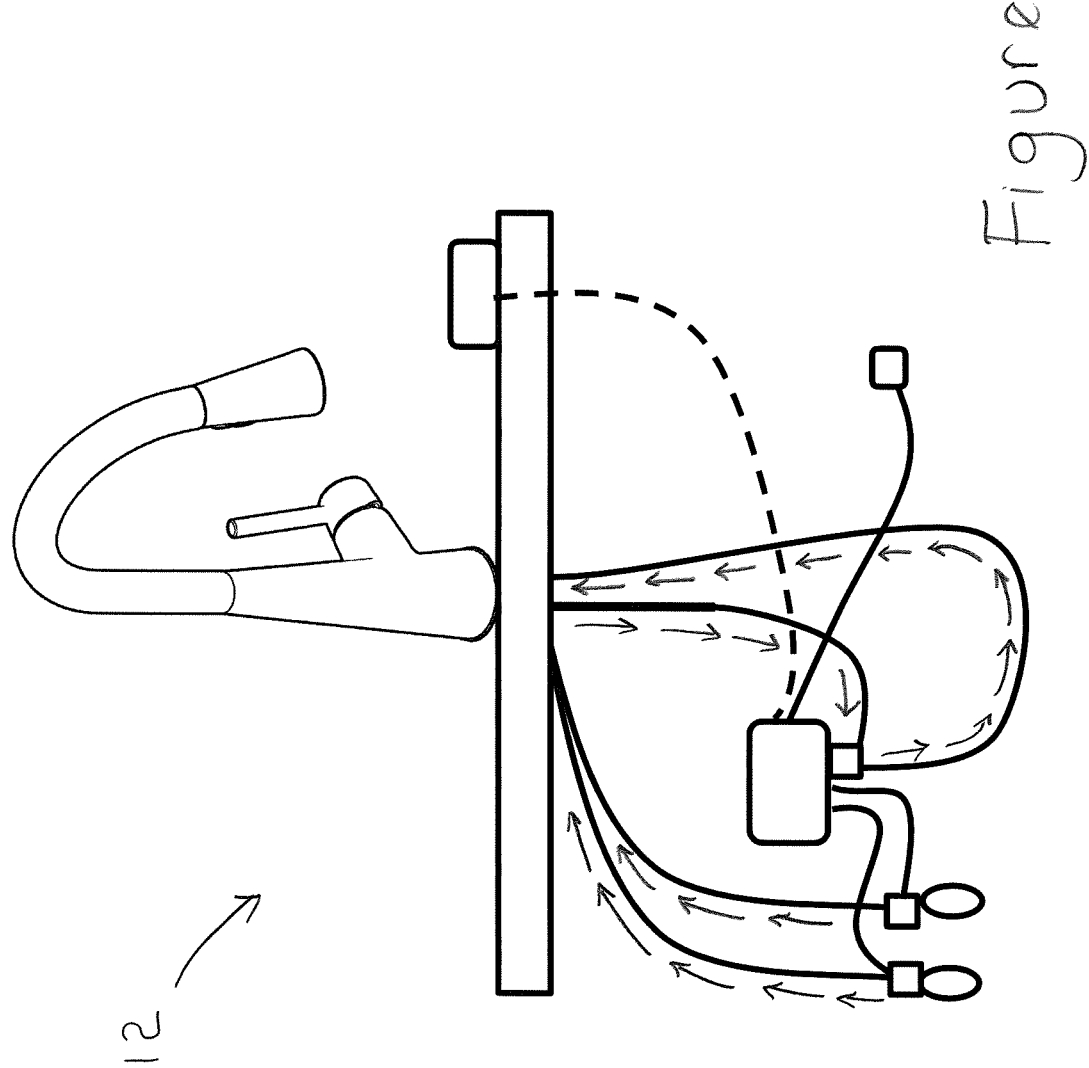

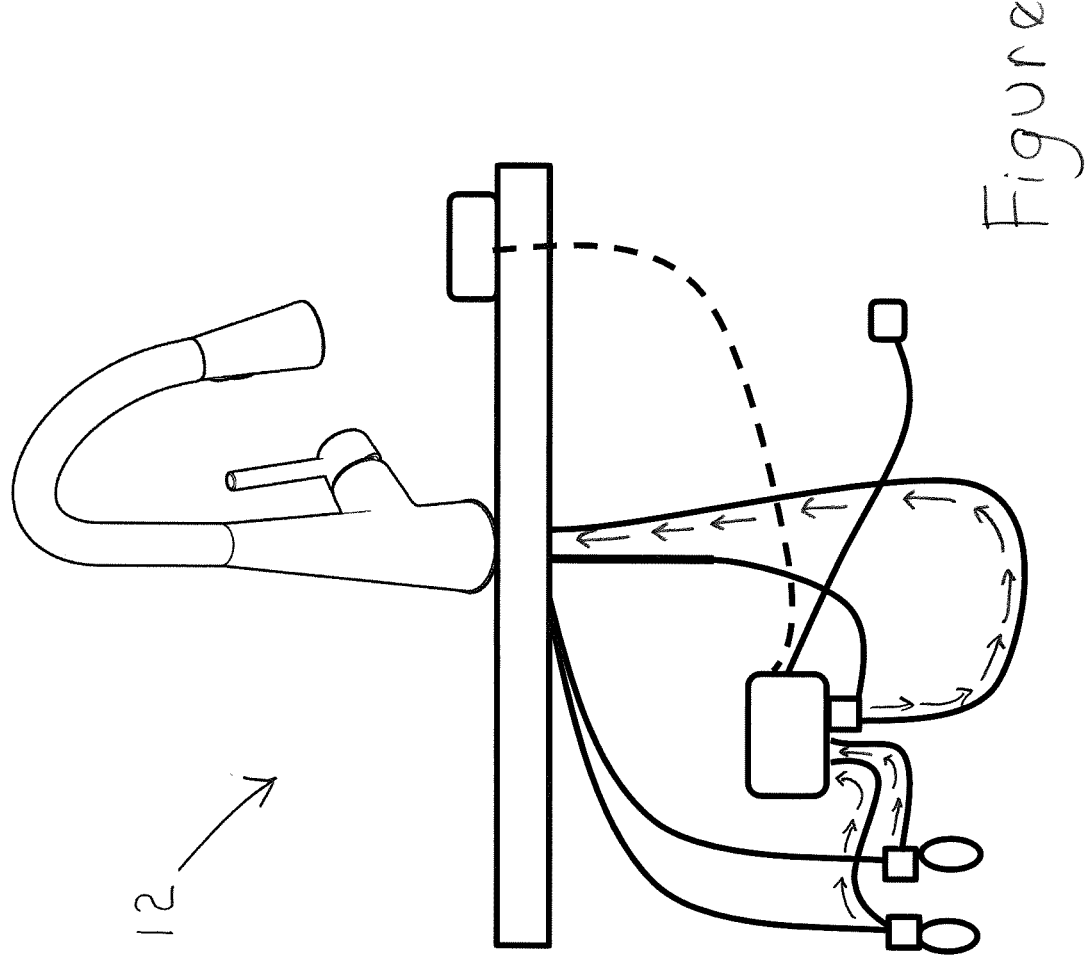

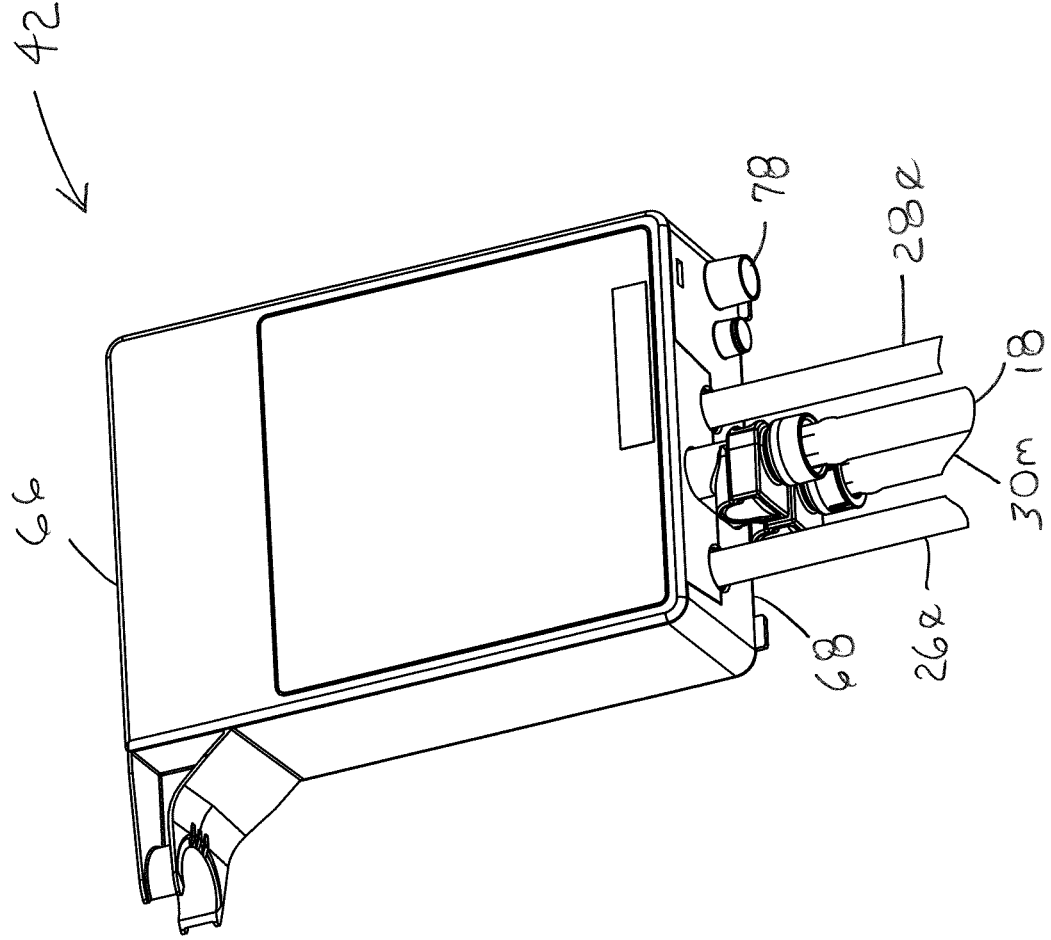

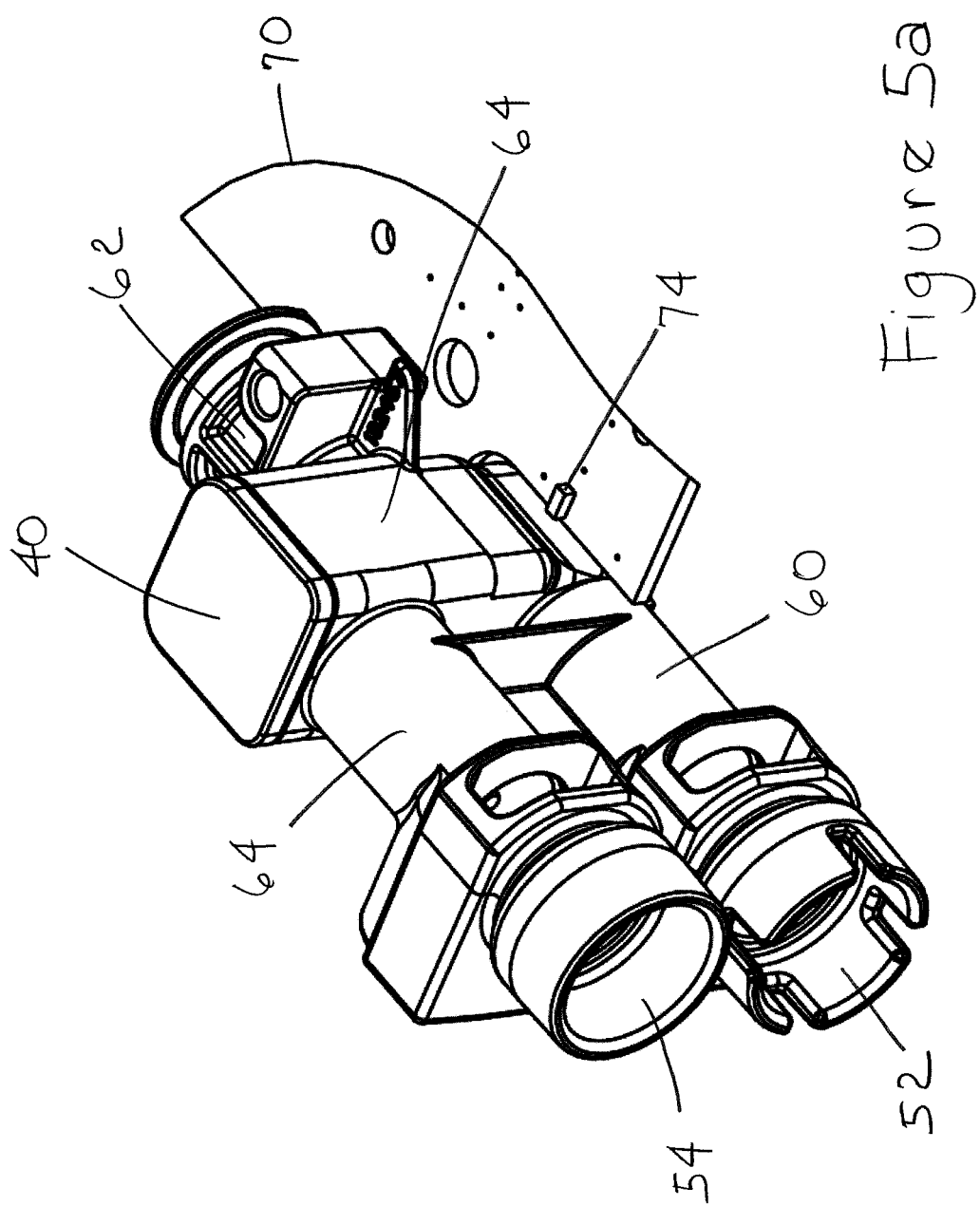

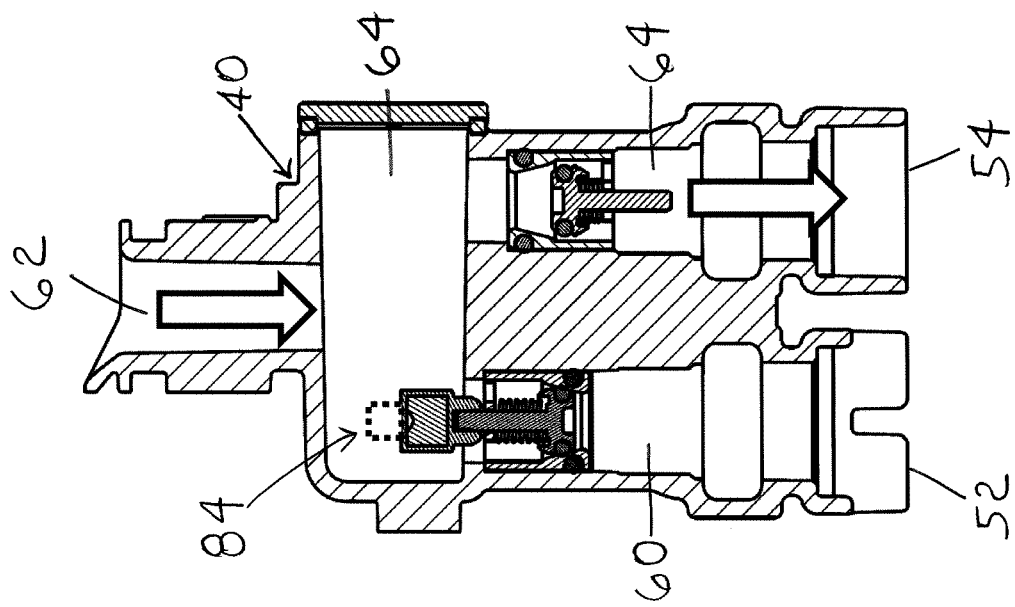
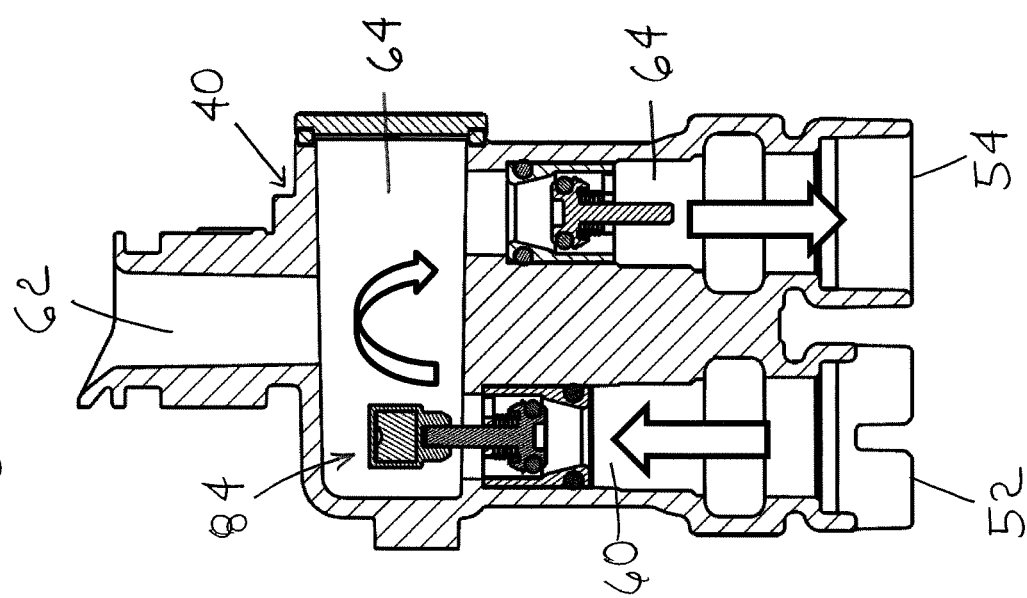

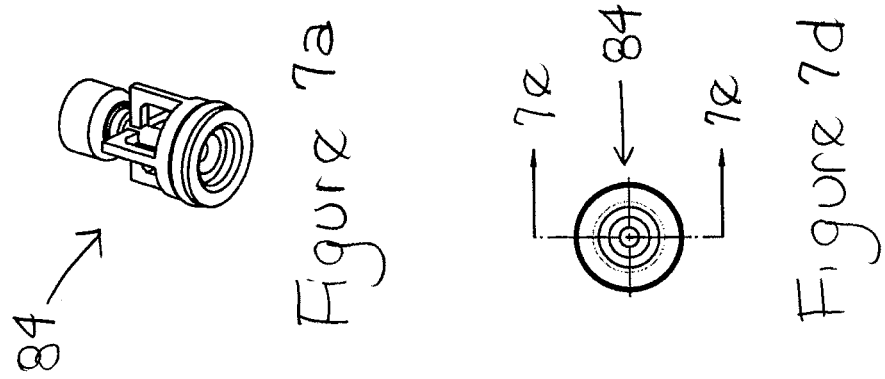
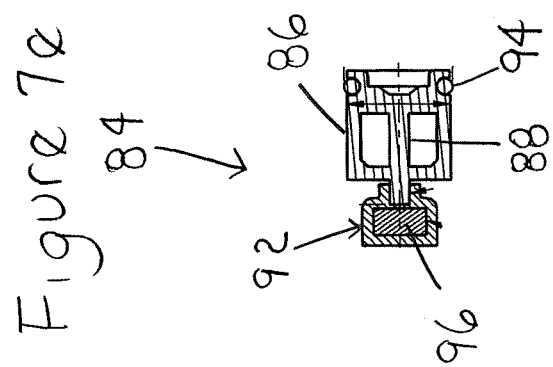
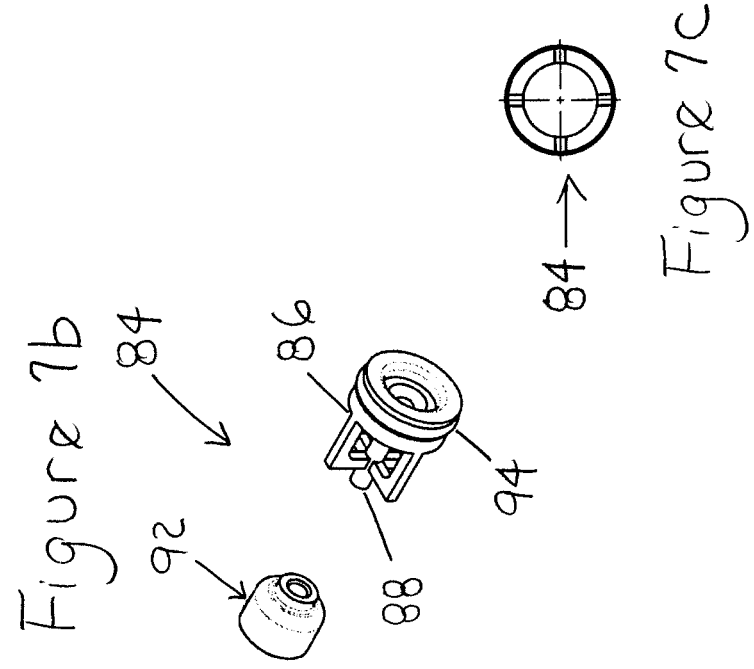
Figure 7a
Figure 7d
Figure 7a
Figure 7c
Figure 7b

ELECTRONIC PLUMBING FIXTURE FITTING INCLUDING FLOW SWITCH

CROSS-REFERENCE TO RELATED APPLICATION

This application claims the benefit of U.S. Provisional Application No. 62/667,273, filed May 4, 2018, the entire disclosure of which is hereby incorporated by reference.

FIELD

The present invention relates generally to an electronic plumbing fixture fitting, such as an electronic faucet, including a mechanical valve, an electronic valve, and a flow switch and, more particularly, to an electronic plumbing fixture fitting, such as an electronic faucet, including a mechanical valve, an electronic valve, and a flow switch, where the flow switch is used to determine if the mechanical valve is activated and to control activation of the electronic valve based on that determination.

BACKGROUND

Electronic plumbing fixture fittings, such as electronic faucets, are well known. Such electronic plumbing fixture fittings are used in residential and commercial applications, such as in kitchens, bathrooms, and various other locations. Users desire to retrofit existing mechanical faucets to include electronic features. Many difficulties can be encountered in an electronic faucet retrofitted from a mechanical faucet.

SUMMARY

The present invention provides a flow switch for an electronic plumbing fixture fitting and an electronic plumbing fixture fitting including a flow switch. The electronic plumbing fixture fitting includes a mechanical valve and an electronic valve.

In an exemplary embodiment, the flow switch includes a body, a shaft, a magnet assembly, and a sensor. The body is operable to be inserted at least partially in a mechanical mixed water line of the fitting. The body includes an opening extending therethrough. The body includes a longitudinal axis extending therethrough. The shaft is operable to be inserted in the opening of the body. The shaft is operable to move in the opening of the body along the longitudinal axis of the body from a first upstream shaft position to a second downstream shaft position. When water is not flowing through the mechanical mixed water line, the shaft is in the first upstream shaft position. When water is flowing through the mechanical mixed water line, the shaft is in the second downstream shaft position. The shaft includes an upstream end and a downstream end. The magnet assembly is operable to be attached to the downstream end of the shaft. The magnet assembly is operable to move with the shaft from a first upstream magnet position to a second downstream magnet position. When water is not flowing through the mechanical mixed water line, the magnet assembly is in the first upstream magnet position. When water is flowing through the mechanical mixed water line, the magnet assembly is in the second downstream magnet position. The magnet assembly includes a magnet having a magnetic field. The magnetic field has a magnitude and a direction. The sensor is operable to be mounted in proximity to the magnet assembly. The sensor is operable to detect at least one of the magnitude and the direction of the magnetic field of the magnet. When the magnet assembly is in the first upstream magnet position, the sensor is operable to detect at least one of a first magnitude and a first direction of the magnetic field of the magnet. When the magnet assembly is in the second downstream magnet position, the sensor is operable to detect at least one of a second magnitude and a second direction of the magnetic field of the magnet. When water is not flowing through the mechanical mixed water line, the magnet assembly is located in the first upstream magnet position and the sensor detects at least one of a magnitude and a direction of the magnetic field of the magnet that is at or near the first magnitude and the first direction of the magnetic field of the magnet. When water starts flowing through the mechanical mixed water line, the magnet assembly moves to the second downstream magnet position and the sensor detects at least one of a magnitude and a direction of the magnetic field of the magnet that is at or near the second magnitude and the second direction of the magnetic field of the magnet. While water is flowing through the mechanical mixed water line, the magnet assembly stays in the second downstream magnet position and the sensor detects at least one of the magnitude and the direction of the magnetic field of the magnet that is at or near the second magnitude and the second direction of the magnetic field of the magnet. When water stops flowing through the mechanical mixed water line, the magnet assembly moves to the first upstream magnet position and the sensor detects at least one of the magnitude and the direction of the magnetic field of the magnet that is at or near the first magnitude and the first direction of the magnetic field of the magnet.

An exemplary embodiment of the electronic plumbing fixture fitting includes a mechanical mixed water line, an electronic water line, a combined water line, and a flow switch. The mechanical mixed water line is operable to receive mixed water from the mechanical valve. The electronic water line is operable to receive water from the electronic valve. The combined water line is operable to receive mixed water from the mechanical mixed water line and water from the electronic water line. The flow switch is operable to be inserted at least partially in the mechanical mixed water line. The flow switch includes a body, a shaft, a magnet assembly, and a sensor. The body is operable to be inserted at least partially in the mechanical mixed water line. The body includes an opening extending therethrough. The body includes a longitudinal axis extending therethrough. The shaft is operable to be inserted in the opening of the body. The shaft is operable to move in the opening of the body along the longitudinal axis of the body from a first upstream shaft position to a second downstream shaft position. When water is not flowing through the mechanical mixed water line, the shaft is in the first upstream shaft position. When water is flowing through the mechanical mixed water line, the shaft is in the second downstream shaft position. The shaft includes an upstream end and a downstream end. The magnet assembly is operable to be attached to the downstream end of the shaft. The magnet assembly is operable to move with the shaft from a first upstream magnet position to a second downstream magnet position. When water is not flowing through the mechanical mixed water line, the magnet assembly is in the first upstream magnet position. When water is flowing through the mechanical mixed water line, the magnet assembly is in the second downstream magnet position. The magnet assembly includes a magnet having a magnetic field. The magnetic field has a magnitude and a direction. The sensor is operable to be mounted in proximity to the magnet assembly. The sensor is operable to detect at least one of the magnitude and the direction of the magnetic field of the magnet. When the magnet assembly is in the first upstream magnet position, the sensor is operable to detect at least one of a first magnitude and a first direction of the magnetic field of the magnet. When the magnet assembly is in the second downstream magnet position, the sensor is operable to detect at least one of a second magnitude and a second direction of the magnetic field of the magnet. When water is not flowing through the mechanical mixed water line, the magnet assembly is located in the first upstream magnet position, the sensor detects at least one of a magnitude and a direction of the magnetic field of the magnet that is at or near the first magnitude and the first direction of the magnetic field of the magnet, a determination can be made that water is not flowing through the mechanical mixed water line, and water is permitted to flow from the electronic valve to the electronic water line to the combined water line. When water starts flowing through the mechanical mixed water line, the magnet assembly moves to the second downstream magnet position, the sensor detects at least one of a magnitude and a direction of the magnetic field of the magnet that is at or near the second magnitude and the second direction of the magnetic field of the magnet, a determination can be made that water is flowing through the mechanical mixed water line, and water is not permitted to flow from the electronic valve to the electronic water line to the combined water line. While water is flowing through the mechanical mixed water line, the magnet assembly stays in the second downstream magnet position, the sensor detects at least one of the magnitude and the direction of the magnetic field of the magnet that is at or near the second magnitude and the second direction of the magnetic field of the magnet, the determination can be made that water is flowing through the mechanical mixed water line, and water is not permitted to flow from the electronic valve to the electronic water line to the combined water line. When water stops flowing through the mechanical mixed water line, the magnet assembly moves to the first upstream magnet position, the sensor detects at least one of the magnitude and the direction of the magnetic field of the magnet that is at or near the first magnitude and the first direction of the magnetic field of the magnet, the determination can be made that water is not flowing through the mechanical mixed water line, and water is permitted to flow from the electronic valve to the electronic water line to the combined water line.

In an exemplary embodiment, the electronic plumbing fixture fitting includes a discharge outlet, a mechanical valve, a mechanical mixed water line, an electronic valve, an electronic water line, a control module, and a flow switch. The discharge outlet is operable to deliver water. The mechanical valve is operable to permit flow of water through the discharge outlet when the mechanical valve is activated and to not permit flow of water through the discharge outlet when the mechanical valve is deactivated. The mechanical mixed water line is operable to receive mixed water from the mechanical valve. The mechanical valve is in parallel with the electronic valve. The electronic valve is operable to permit flow of water through the discharge outlet when the electronic valve is activated and to not permit flow of water through the discharge outlet when the electronic valve is deactivated. The electronic water line is operable to receive water from the electronic valve. The control module is operable to mount below a mounting surface. The mechanical valve is located outside the control module. The electronic valve is located inside the control module. The flow switch is operable to be inserted at least partially in the mechanical mixed water line. The flow switch includes a body, a shaft, a magnet assembly, and a sensor. The body is operable to be inserted at least partially in the mechanical mixed water line. The body includes an opening extending therethrough. The body includes a longitudinal axis extending therethrough. The shaft is operable to be inserted in the opening of the body. The shaft is operable to move in the opening of the body along the longitudinal axis of the body from a first upstream shaft position to a second downstream shaft position. When water is not flowing through the mechanical mixed water line, the shaft is in the first upstream shaft position. When water is flowing through the mechanical mixed water line, the shaft is in the second downstream shaft position. The shaft includes an upstream end and a downstream end. The magnet assembly is operable to be attached to the downstream end of the shaft. The magnet assembly is operable to move with the shaft from a first upstream magnet position to a second downstream magnet position. When water is not flowing through the mechanical mixed water line, the magnet assembly is in the first upstream magnet position. When water is flowing through the mechanical mixed water line, the magnet assembly is in the second downstream magnet position. The magnet assembly includes a magnet having a magnetic field. The magnetic field has a magnitude and a direction. The sensor is operable to be mounted in proximity to the magnet assembly. The sensor is operable to detect at least one of the magnitude and the direction of the magnetic field of the magnet. When the magnet assembly is in the first upstream magnet position, the sensor is operable to detect at least one of a first magnitude and a first direction of the magnetic field of the magnet. When the magnet assembly is in the second downstream magnet position, the sensor is operable to detect at least one of a second magnitude and a second direction of the magnetic field of the magnet. When water is not flowing through the mechanical mixed water line, the magnet assembly is located in the first upstream magnet position, the sensor detects at least one of a magnitude and a direction of the magnetic field of the magnet that is at or near the first magnitude and the first direction of the magnetic field of the magnet, a determination can be made that water is not flowing through the mechanical mixed water line, and the electronic valve can be activated. When water starts flowing through the mechanical mixed water line, the magnet assembly moves to the second downstream magnet position, the sensor detects at least one of a magnitude and a direction of the magnetic field of the magnet that is at or near the second magnitude and the second direction of the magnetic field of the magnet, a determination can be made that water is flowing through the mechanical mixed water line, and the electronic valve cannot be activated. While water is flowing through the mechanical mixed water line, the magnet assembly stays in the second downstream magnet position, the sensor detects at least one of the magnitude and the direction of the magnetic field of the magnet that is at or near the second magnitude and the second direction of the magnetic field of the magnet, the determination can be made that water is flowing through the mechanical mixed water line, and the electronic valve cannot be activated. When water stops flowing through the mechanical mixed water line, the magnet assembly moves to the first upstream magnet position, the sensor detects at least one of the magnitude and the direction of the magnetic field of the magnet that is at or near the first magnitude and the first direction of the magnetic field of the magnet, the determination can be made that water is not flowing through the mechanical mixed water line, and the electronic valve can be activated.

BRIEF DESCRIPTION OF THE DRAWINGS

FIGS. 3a-3c are schematic illustrations of an electronic faucet according to an exemplary embodiment of the present invention—FIG. 3a is a schematic illustration showing components of the electronic faucet, FIG. 3b is a schematic illustration showing flow of water when a mechanical valve of the electronic faucet is activated, and FIG. 3c is a schematic illustration showing flow of water when an electronic valve of the electronic faucet is activated;

FIGS. 4a and 4b are views of a control module of an electronic faucet according to an exemplary embodiment of the present invention—FIG. 4a is a bottom, front, left side view, and FIG. 4b is a bottom, front, right side view with a front panel removed;

FIGS. 5a and 5b are views of a portion of a control module of an electronic faucet according to exemplary embodiments of the present invention—FIG. 5a is a bottom, front, right side view according to the exemplary embodiment of FIGS. 4a and 4b, and FIG. 5b is a bottom, front, right side view according to other exemplary embodiments;

FIGS. 6a-6c are views of a flow switch in the control module of the electronic faucet according to the exemplary embodiment of FIGS. 4a, 4b, and 5a-FIG. 6a is a left side cross-sectional view through a mixed water inlet and a mixed water outlet, FIG. 6b is a left side cross-sectional view showing flow of water when the mechanical valve of the electronic faucet is activated; and FIG. 6c is a left side cross-sectional view showing flow of water when the electronic valve of the electronic faucet is activated; and FIGS. 7a-7e are views of a flow switch of an electronic faucet according to another exemplary embodiment of the present invention—FIG. 7a is an assembled bottom perspective view, FIG. 7b is an exploded bottom perspective view, FIG. 7c is a top plan view, FIG. 7d is a bottom plan view, and FIG. 7e is a cross-sectional view taken along the line 7e-7e in FIG. 7d.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
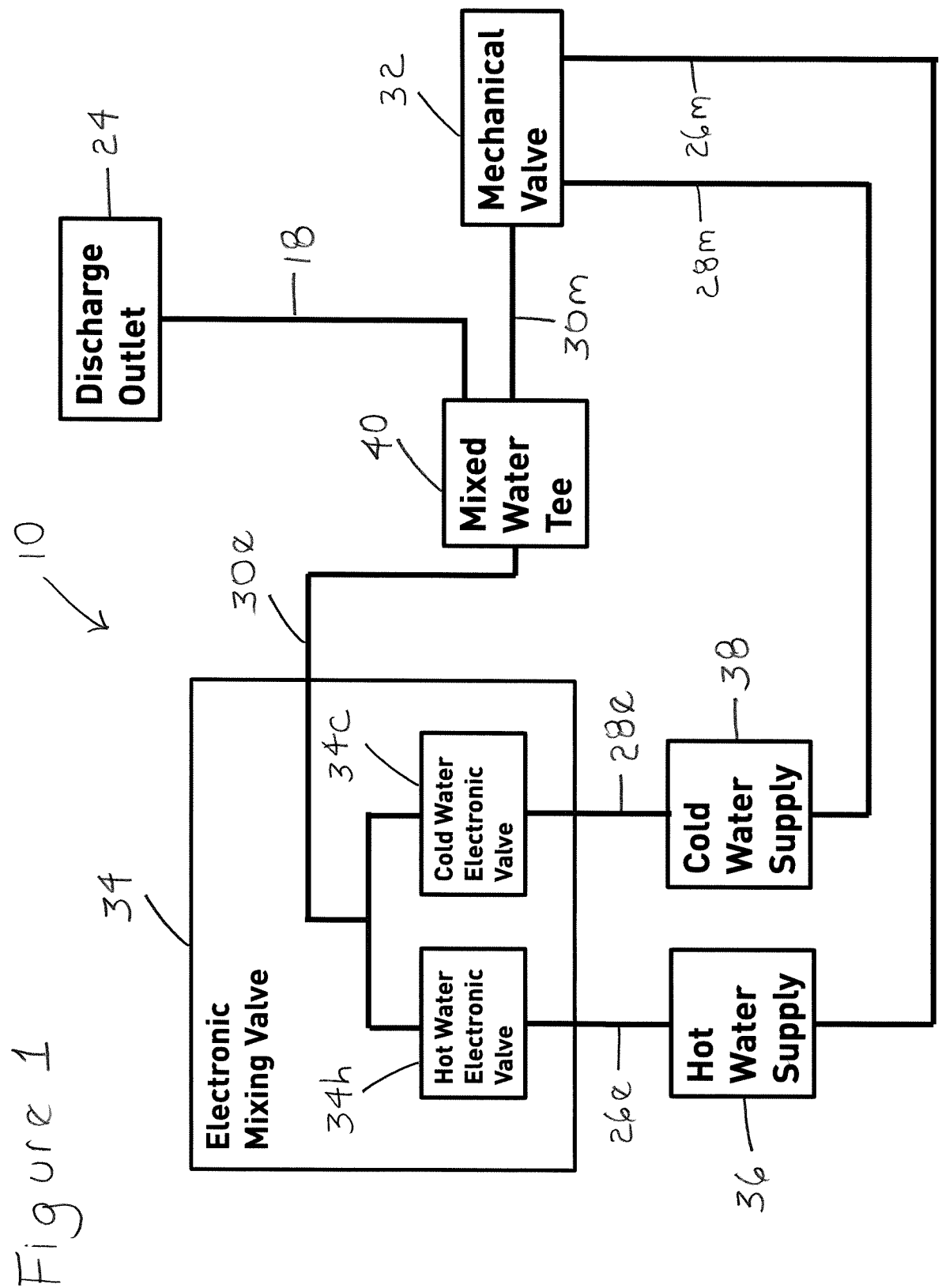
FIG. 1 is a schematic illustration of fluidic components of an electronic plumbing fixture fitting according to an exemplary embodiment of the present invention.
Figure 2:
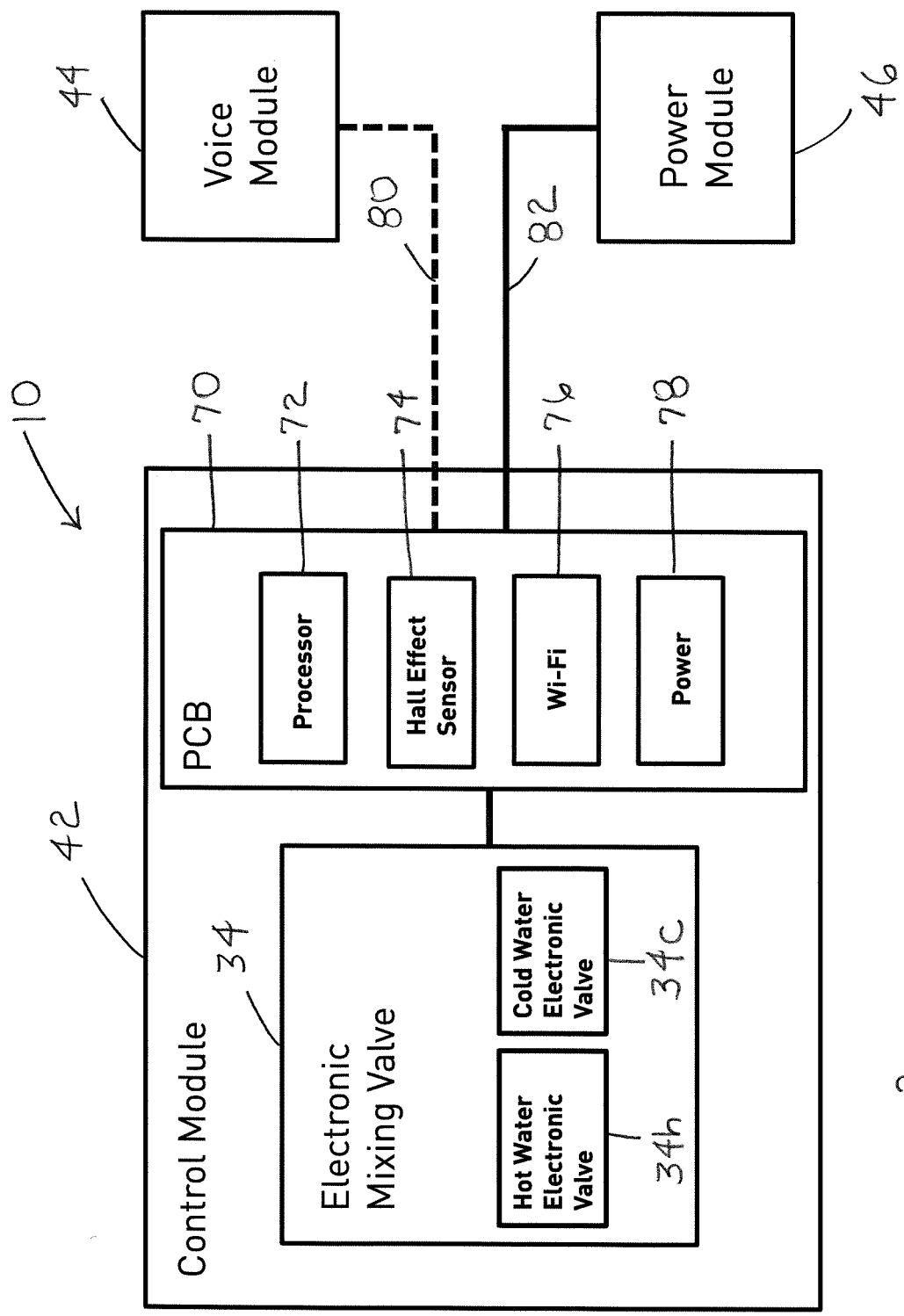
FIG. 2 is a schematic illustration of electrical/electronic components of an electronic plumbing fixture fitting according to an exemplary embodiment of the present invention.
Figure 3A:
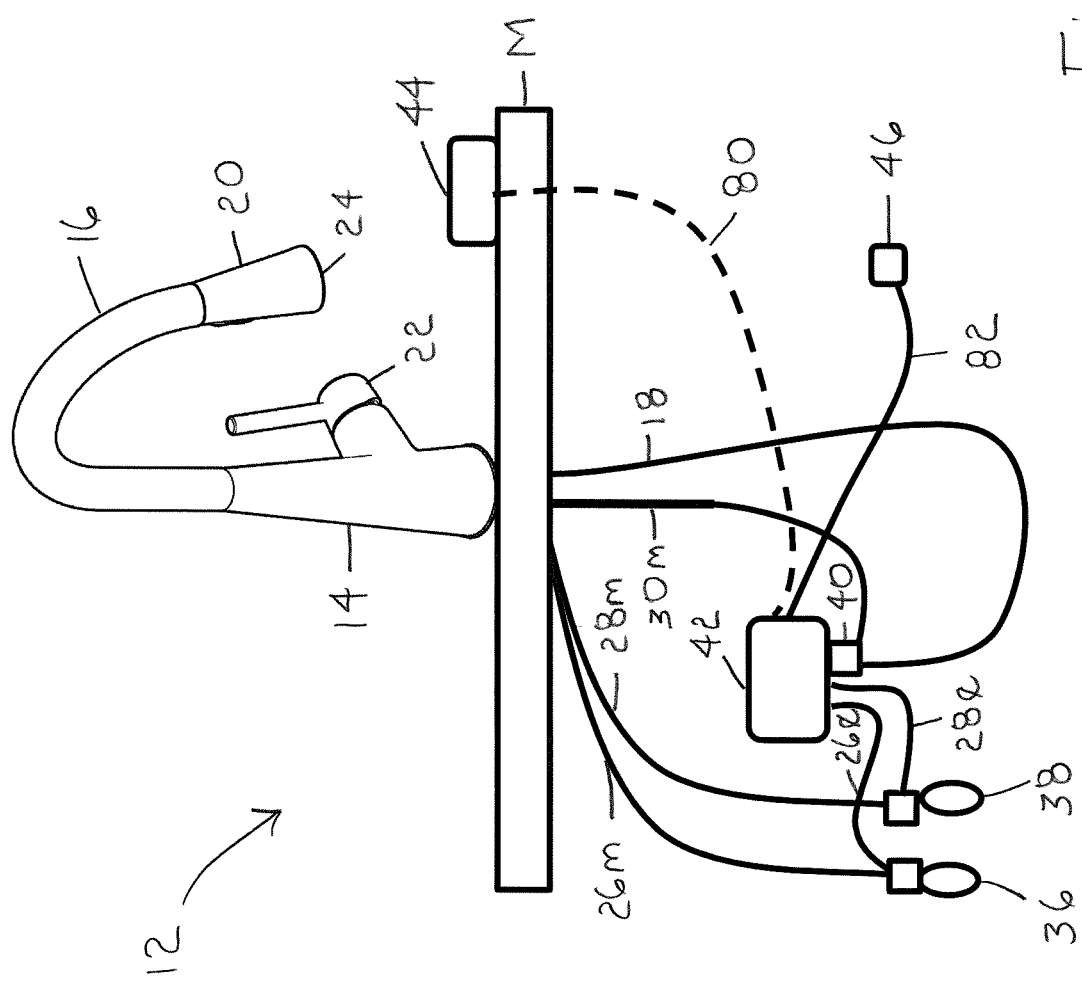

An exemplary embodiment of an electronic plumbing fixture fitting 10, such as an electronic faucet 12, is illustrated in FIGS. 1 and 2. FIG. 1 primarily shows the fluidic components and connections of the electronic plumbing fixture fitting 10, and FIG. 2 primarily shows the electrical/electronic components and connections of the electronic plumbing fixture fitting 10. An exemplary embodiment of the electronic faucet 12 is illustrated in FIGS. 3a-3c. FIG. 3a primarily shows the components of the electronic faucet 12, FIG. 3b primarily shows the flow of water through the electronic faucet 12 in a mechanical mode, and FIG. 3c primarily shows the flow of water through the electronic faucet 12 in an electronic mode.

In the illustrated embodiment, as best shown in FIGS. 3a-3c, the faucet 12 includes a hub 14, a spout 16, a wand hose 18, a wand 20, and a handle 22. An upstream end of the hub 14 is connected to a mounting surface M (such as a counter or sink). An upstream end of the spout 16 is connected to a downstream end of the hub 14. The spout 16 is operable to rotate relative to the hub 14. The wand hose 18 extends through the hub 14 and the spout 16 and is operable to move within the hub 14 and the spout 16. An upstream end of the wand 20 is mounted in a downstream end of the spout 16 and is connected to a downstream end of the wand hose 18. A downstream end of the wand 20 includes a discharge outlet 24 through which water is delivered from the faucet 12. The wand 20 is operable to pull away from the spout 16. The handle 22 is connected to a side of the hub 14 and is operable to move relative to the hub 14. Although the faucet 12 has been described as having a rotatable spout 16, a pull-out or pull-down wand 20, and a handle 22 mounted on the hub 14, one of ordinary skill in the art will appreciate that, in certain embodiments, the spout 16 could be fixed relative to the hub 14, the faucet 12 may not include a wand 20, the handle 22 could be mounted on other locations on the faucet 12, the faucet 12 could include more than one handle 22, and/or the handle 22 could be any mechanical or other device that can be used to operate a mechanical valve.

Additionally, in the illustrated embodiments, as best shown in FIGS. 1 and 3a-3c, the fitting 10 includes a mechanical hot water line 26m, an electronic hot water line 26e, a mechanical cold water line 28m, an electronic cold water line 28e, a mechanical mixed water line 30m, an electronic mixed water line 30e, a mechanical valve 32, and an electronic valve 34. In the illustrated embodiments, the electronic valve 34 is an electronic mixing valve that includes a hot water electronic valve 34h and a cold water electronic valve 34c.

An upstream end of the mechanical hot water line 26m connects to a hot water supply 36, and an upstream end of the mechanical cold water line 28m connects to a cold water supply 38. A downstream end of the mechanical hot water line 26m connects to the mechanical valve 32, and a downstream end of the mechanical cold water line 28m connects to the mechanical valve 32.

An upstream end of the electronic hot water line 26e connects to the hot water supply 36, and an upstream end of the electronic cold water line 28e connects to the cold water supply 38. A downstream end of the electronic hot water line 26e connects to the electronic valve 34, and a downstream end of the electronic cold water line 28e connects to the electronic valve 34. More particularly, a downstream end of the electronic hot water line 26e connects to the hot water electronic valve 34h, and a downstream end of the electronic cold water line 28e connects to the cold water electronic valve 34c.

An upstream end of the mechanical mixed water line 30m connects to the mechanical valve 32, and an upstream end of the electronic mixed water line 30e connects to the electronic valve 34. More particularly, an upstream end of the electronic mixed water line 30e connects to the hot water electronic valve 34h and the cold water electronic valve 34c. A downstream end of the mechanical mixed water line 30m connects to a mixed water tee 40, and a downstream end of the electronic mixed water line 30e connects to the mixed water tee 40. An upstream end of the wand hose 18 (which can also be referred to as a combined mixed water line) connects to the mixed water tee 40. As stated above, the downstream end of the wand hose 18 connects to the upstream end of the wand 20, and the downstream end of the wand 20 includes the discharge outlet 24 through which water is delivered from the faucet 12.

In the illustrated embodiments, each portion of the hot water lines 26m, 26e, the cold water lines 28m, 28e, and the mixed water lines 30m, 30e is shown as including at least one hose, pipe, or passage. However, one of ordinary skill in the art will appreciate that each portion of the hot water lines 26m, 26e, the cold water lines 28m, 28e, and the mixed water lines 30m, 30e could include more than one hose, pipe, or passage. Similarly, each portion of the hot water lines 26m, 26e, the cold water lines 28m, 28e, and the mixed water lines 30m, 30e could include a combination of hose(s), pipe(s), and/or passage(s). In an exemplary embodiment, the hoses are flexible hoses. However, one of ordinary skill in the art will appreciate that other types of hoses could be used. If a portion of the hot water lines 26m, 26e, the cold water lines 28m, 28e, or the mixed water lines 30m, 30e includes more than one hose, pipe, and/or passage, the hose(s), pipe(s), and/or passage(s) are connected via connectors. In an exemplary embodiment for the flexible hoses, the connectors are push-fit connectors. However, one of ordinary skill in the art will appreciate that other types of connectors could be used.

When reference is made to one component of the faucet 12 connecting to another component of the faucet 12, the connection may be direct or indirect. One of ordinary skill in the art will appreciate that additional components may be needed if the connection is indirect.

In the illustrated embodiments, as best shown in FIGS. 1, 3a-3c, and 6a-6c, the mechanical valve 32 is in parallel with the electronic valve 34. The mechanical valve 32 is operable to permit flow of water through the discharge outlet 24 when the mechanical valve 32 is activated and to not permit flow of water through the discharge outlet 24 when the mechanical valve 32 is deactivated. The electronic valve 34 is operable to permit flow of water through the discharge outlet 24 when the electronic valve 34 is activated and to not permit flow of water through the discharge outlet 24 when the electronic valve 34 is deactivated.

Although the faucet 12 has been described as including a mechanical valve 32 and an electronic valve 34 and, more particularly, a hot water electronic valve 34h and a cold water electronic valve 34c, one of ordinary skill in the art will appreciate that the faucet 12 could include one or more mechanical valves and/or one or more electronic valves. Additionally, although the faucet 12 has been described as including an electronic valve 34 that is an electronic mixing valve, one of ordinary skill in the art will appreciate that the faucet 12 could include just a hot water electronic valve or just a cold water electronic valve.

In an exemplary embodiment, the hot water electronic valve 34h and the cold water electronic valve 34c are proportional valves and, more specifically, stepper motor actuated valves. However, one of ordinary skill in the art will appreciate that the electronic valves 34h, 34c could be any type of electronic valves, including, but not limited to, solenoid valves and electronic throttle valves.

Figure 4B:
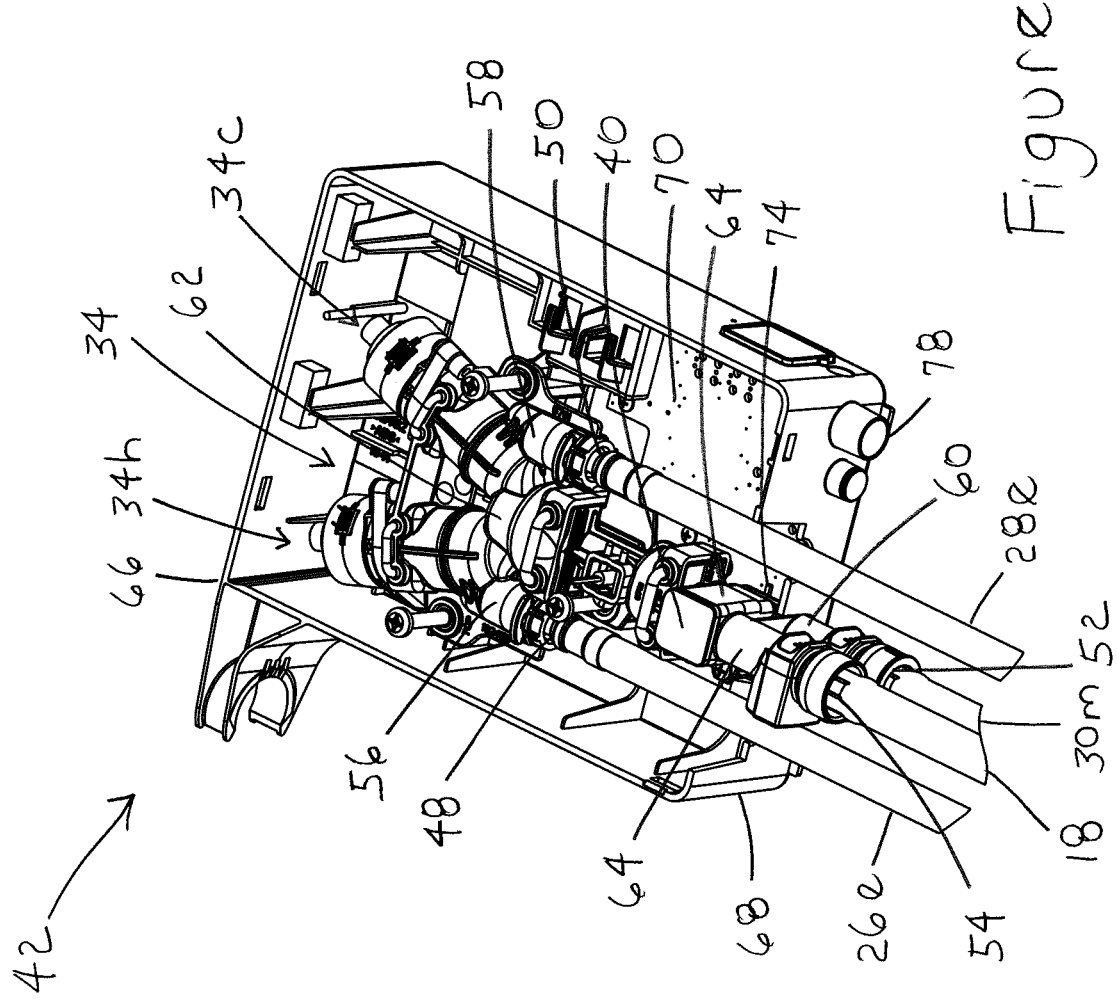
Figure 5B:
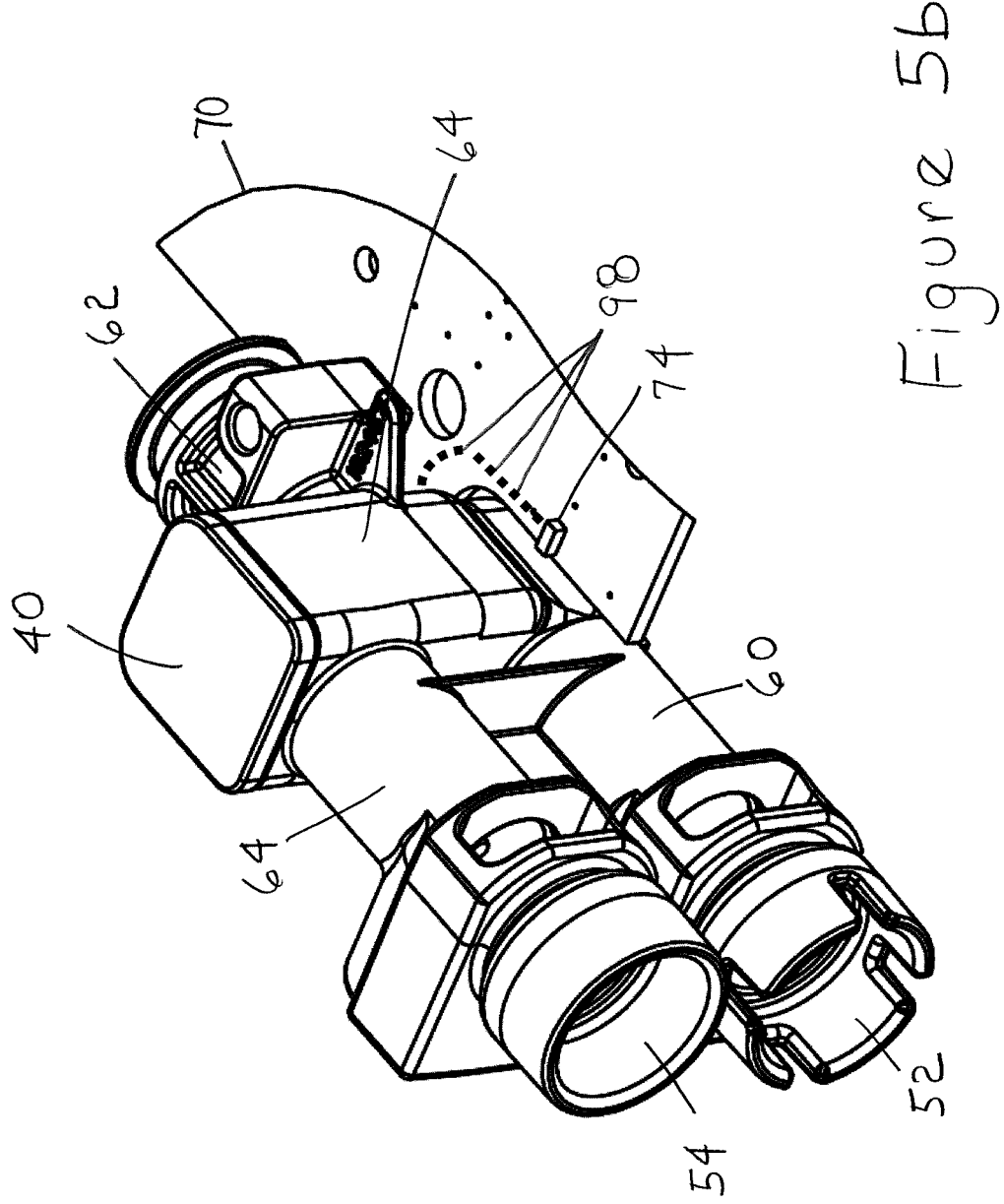

Further, in the illustrated embodiments, as best shown in FIGS. 2 and 3a-3c, the fitting 10 includes a control module 42, a voice module 44, and a power module 46. The control module 42 is shown in greater detail in FIGS. 4a and 4b.

The flow components of the control module 42 include a number of inlets and outlets and a number of flow passages. These inlets/outlets and flow passages enable the easy management of the flow between the incoming flows (i.e., the electronic hot water line 26e, the electronic cold water line 28e, and the mechanical mixed water line 30m) and the outgoing flow (i.e., the combined mixed water line or the wand hose 18).

In the illustrated embodiment, as best shown in FIGS. 4a-6c, the flow components of the control module 42 include the following inlets:

1. a hot water inlet 48 operable to receive hot water from the hot water supply 36—as illustrated, the hot water inlet 48 fluidly connects to the electronic hot water line 26e, 2. a cold water inlet 50 operable to receive cold water from the cold water supply 38—as illustrated, the cold water inlet 50 fluidly connects to the electronic cold water line 28e, and 3. a mixed water inlet 52 operable to receive mixed water from the mechanical valve 32—as illustrated, the mixed water inlet 52 fluidly connects to the mechanical mixed water line 30m.

In the illustrated embodiment, as best shown in FIGS. 4a-6c, the flow components of the control module 42 include the following outlet:

1. a mixed water outlet 54 operable to discharge mixed water from the mechanical valve 32 or the electronic valve 34 to the discharge outlet 24—as illustrated, the mixed water outlet 54 fluidly connects to the combined mixed water line or the wand hose 18.

In the illustrated embodiment, as best shown in FIGS. 4a-6c, the flow components of the control module 42 include the following flow passages:

1. an electronic hot water passage 56 operable to fluidly connect the hot water inlet 48 and the electronic valve 34 and, more particularly, the hot water electronic valve 34h—the electronic hot water passage 56 is a part of the electronic hot water line 26e, 2. an electronic cold water passage 58 operable to fluidly connect the cold water inlet 50 and the electronic valve 34 and, more particularly, the cold water electronic valve 34c—the electronic cold water passage 58 is a part of the electronic cold water line 28e, 3. an electronic mixed water passage 62 operable to fluidly connect the electronic valve 34 and the mixed water tee 40—the electronic mixed water passage 62 is a part of the electronic mixed water line 30e, 4. a mechanical mixed water passage 60 operable to fluidly connect the mixed water inlet 52 and the mixed water tee 40—the mechanical mixed water passage 60 is a part of the mechanical mixed water line 30m, and 5. a combined mixed water passage 64 operable to fluidly connect: (a) the electronic mixed water passage 62 and the mixed water outlet 54, and (b) the mechanical mixed water passage 60 and the mixed water outlet 54—the combined mixed water passage 64 is a part of the mixed water tee 40 and the combined mixed water line or wand hose 18.

In the illustrated embodiment, as best shown in FIGS. 3a-4b, the control module 42 is operable to mount below the mounting surface M (such as the counter or sink). More specifically, the control module 42 is operable to mount on a mounting shank of the fitting 10 or the faucet 12. In the illustrated embodiment, the mechanical valve 32 is located outside the control module 42 in the hub 14 of the faucet 12, and the electronic valve 34 is located inside the control module 42. In the illustrated embodiment, the control module 42 includes a top or first side 66 and a bottom or second side 68. The first side 66 is opposite the second side 68. In the illustrated embodiment, the first side 66 includes a bracket extending therefrom that is operable to mount the control module 42 on the mounting shank. In the illustrated embodiment, the second side 68 includes openings for hoses and flow passages.

In the illustrated embodiments, as best shown in FIGS. 2 and 4a-5b, the control module 42 further includes a number of electronic components. These components enable the operation of the fitting 10 or the faucet 12. More specifically, these components enable the activation, deactivation, and control of the electronic valve 34 through voice input. The control module 42 includes the electronic valve 34 and a printed circuit board ("PCB") 70. In the illustrated embodiment, a number of electronic components are mounted on the PCB 70, including, but not limited to, a processor 72, a Hall effect sensor 74, a Wi-Fi chip 76, and a power port 78.

In the illustrated embodiments, as best shown in FIGS. 2-3c, the voice module 44 provides operational instructions to the electronic components of the fitting 10 or the faucet 12. The voice module 44 can be any voice controlled intelligent personal assistant, such as Amazon Echo or Alexa sold by Amazon.com, Inc. of Seattle, Wash. and Google Home or Assistant sold by Google LLC of Mountain View, Calif. The voice module 44 receives voice input from a user and sends signals to the control module 42 or other electronic components of the fitting 10 or the faucet 12 to control operation of the components of the fitting 10 or the faucet 12. More specifically, the voice module 44 receives voice input from a user and sends signals to the processor 72 to activate, deactivate, and control the electronic valve 34. In the illustrated embodiments, the voice module 44 is connected to the control module 42 via a Wi-Fi connection 80. In the illustrated embodiment, the voice module 44 sends the signals to the processor 72 through the Wi-Fi connection 80. In the illustrated embodiment, the voice module 44 is located on the mounting surface M. However, one of ordinary skill in the art will appreciate that the voice module 44 could be in any other location where it can send the signals to the control module 42 or other electronic components of the fitting 10 or the faucet 12, such as the processor 72.

In the illustrated embodiments, as best shown in FIGS. 2-3c, the power module 46 provides power to the electrical/electronic components of the fitting 10 or the faucet 12. In the illustrated embodiments, the power module 46 is operable to mount below the mounting surface M. In the illustrated embodiments, the power module 46 is connected to the control module 42 via a hard-wired connection 82. In an exemplary embodiment, the power module 46 includes battery power. In an exemplary embodiment, the power module 46 includes AC power.

In the illustrated embodiments, as best shown in FIGS. 6a-7e, the fitting 10 or the faucet 12 includes a flow switch 84. The flow switch 84 is used to determine whether the mechanical valve 32 is activated by detecting whether water is flowing through the mechanical mixed water line 30m. This determination is then used to control activation of the electronic valve 34. In the illustrated embodiments, the flow switch 84 includes a body 86, a shaft 88, a spring 90, a magnet assembly 92, the Hall effect sensor 74, and seals 94. The body 86, the shaft 88, and the spring 90 of the flow switch 84 are similar to corresponding components of a check valve. In an exemplary embodiment, the shaft 88 of the flow switch 84 is longer than a shaft of a standard check valve.

In the illustrated embodiments, as best shown in FIGS. 6a-7e, the body 86 is operable to be inserted at least partially in the mechanical mixed water line 30m. In the illustrated embodiments, the body 86 is operable to be secured at least partially in the mechanical mixed water line 30m. The body 86 includes an opening extending therethrough. In the illustrated embodiment, the body 86 includes a central opening extending therethrough. The body 86 includes a longitudinal axis extending therethrough. In the illustrated embodiment, the body 86 includes a central longitudinal axis extending therethrough.

In the illustrated embodiments, as best shown in FIGS. 6a-7e, the shaft 88 is operable to be inserted in the opening of the body 86. In the illustrated embodiments, the shaft 88 is operable to be inserted in the central opening of the body 86. The shaft 88 is operable to move in the opening of the body 86 along the longitudinal axis of the body 86 from a first upstream shaft position to a second downstream shaft position. In the illustrated embodiment, the shaft 88 is operable to move in the central opening of the body 86 along the central longitudinal axis of the body 86 from the first upstream shaft position to the second downstream shaft position. In an exemplary embodiment, the shaft 88 is operable to move solely along the longitudinal axis of the body 86. In the illustrated embodiment, the shaft 88 is operable to move solely along the central longitudinal axis of the body 86. When water is not flowing through the mechanical mixed water line 30m, the shaft 88 is in the first upstream shaft position (see FIGS. 6a and 6c). When water is flowing through the mechanical mixed water line 30m, the shaft 88 is in the second downstream shaft position (see FIG. 6b). The shaft 88 includes an upstream end and a downstream end.

Figure 6A:
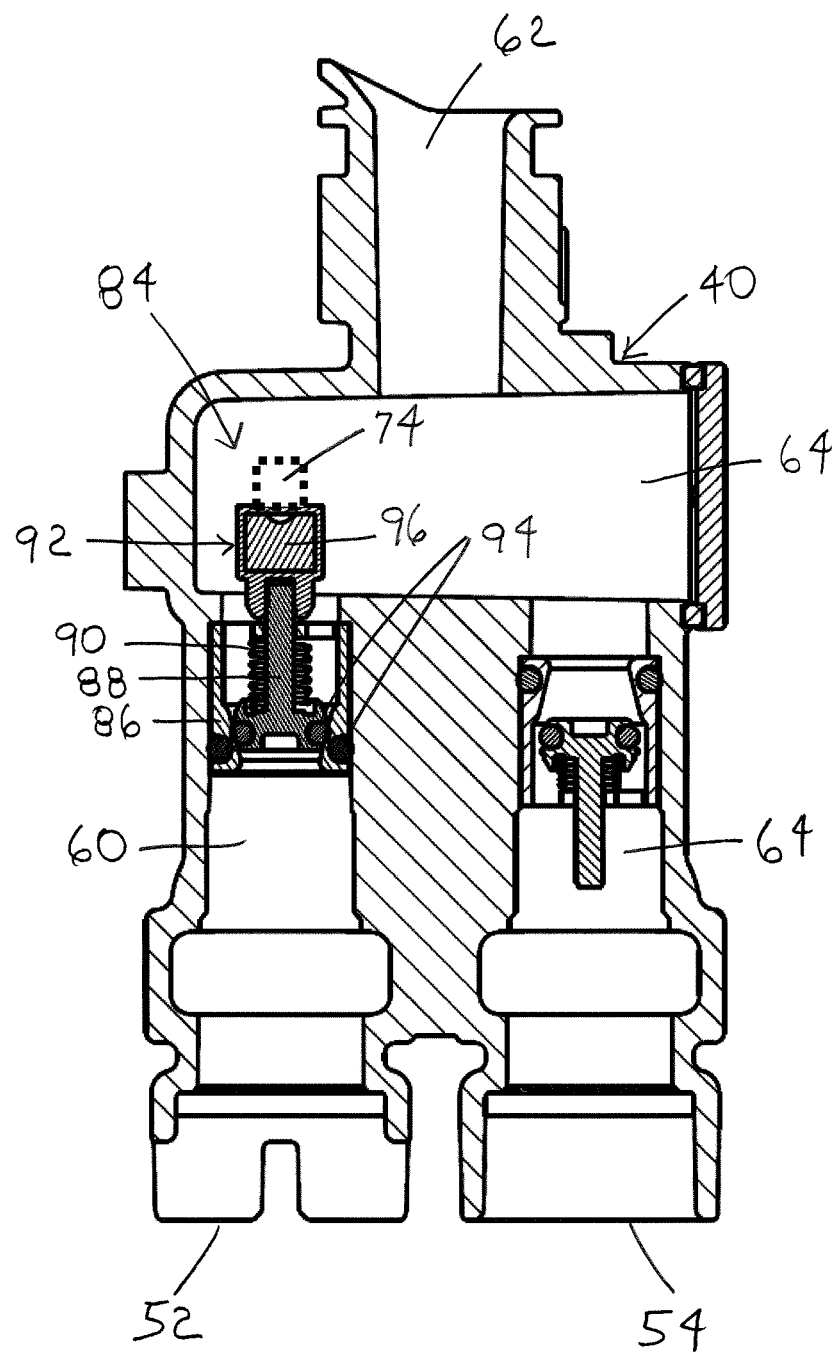

In the illustrated embodiments, as best shown in FIGS. 6a-6c, the spring 90 is operable to surround the shaft 88. The spring 90 is not shown in FIGS. 7a-7e for simplicity. When water is not flowing through the mechanical mixed water line 30m, the spring 90 is not compressed (see FIGS. 6a and 6c). When water is flowing through the mechanical mixed water line 30m, the spring 90 is compressed (see FIG. 6b). When water stops flowing through the mechanical mixed water line 30m, the shaft 88 moves from the second downstream shaft position to the first upstream shaft position through force from the spring 90.

In the illustrated embodiments, as best shown in FIGS. 6a-7e, the magnet assembly 92 is operable to be attached to the downstream end of the shaft 88. In an exemplary embodiment, the magnet assembly 92 is press fit onto the downstream end of the shaft 88. However, one of ordinary skill in the art will appreciate that the magnet assembly 82 can be attached to the downstream end of the shaft 88 using various known attachment mechanisms. The magnet assembly 92 is operable to move with the shaft 88 from a first upstream magnet position to a second downstream magnet position. When water is not flowing through the mechanical mixed water line 30m, the magnet assembly 92 is in the first upstream magnet position (see FIGS. 6a and 6c). When water is flowing through the mechanical mixed water line 30m, the magnet assembly 92 is in the second downstream magnet position (see FIG. 6b). In an exemplary embodiment, while water is flowing through the mechanical mixed water line 30m, the magnet assembly 92 stays in the second downstream magnet position through pressure of the flowing water.

The magnet assembly 92 includes a magnet 96 having a magnetic field. The magnetic field has a magnitude and a direction. In an exemplary embodiment, the magnet assembly 92 includes a single magnet. In an exemplary embodiment, the magnet assembly 92 includes overmolding around the magnet 96. However, one of ordinary skill in the art will appreciate that the magnet assembly 92 may not include overmolding around the magnet 96.

The Hall effect sensor 74 is operable to be mounted in proximity to the magnet assembly 92 (and, thus, the magnet 96). The Hall effect sensor 74 is operable to detect at least one of the magnitude and the direction of the magnetic field of the magnet 96. When the magnet assembly 92 is in the first upstream magnet position (see FIGS. 6a and 6c), the Hall effect sensor 74 detects at least one of a first magnitude and a first direction of the magnetic field of the magnet 96. In an exemplary embodiment, in the first upstream magnet position, the Hall effect sensor 74 may not detect a magnitude or a direction of the magnetic field of the magnet 96 so the first magnitude of the magnetic field of the magnet 96 would be zero and the first direction of the magnetic field of the magnet 96 would be none. When the magnet assembly 92 is in the second downstream magnet position (see FIG. 6b), the Hall effect sensor 74 detects at least one of a second magnitude and a second direction of the magnetic field of the magnet 96.

In an exemplary embodiment, a threshold can be set between at least one of the first magnitude and the second magnitude of the magnetic field of the magnet 96 and the first direction and the second direction of the magnetic field of the magnet 96. In an exemplary embodiment, the threshold is set at a mid-point between at least one of the first magnitude and the second magnitude of the magnetic field of the magnet 96 and the first direction and the second direction of the magnetic field of the magnet 96.

In an exemplary embodiment, when the Hall effect sensor 74 detects at least one of a magnitude and a direction of the magnetic field of the magnet 96 that is at or near the first magnitude and the first direction of the magnetic field of the magnet 96, the detected magnitude and/or the detected direction are/is below the threshold and the magnet assembly 92 is in the first upstream magnet position (see FIGS. 6a and 6c). In the exemplary embodiment in the first upstream magnet position where the Hall effect sensor 74 does not detect a magnitude or a direction of the magnetic field of the magnet 96 so the first magnitude of the magnetic field of the magnet 96 is zero and the first direction of the magnetic field of the magnet 96 is none, the detected magnitude and/or the detected direction are/is below the threshold. In an exemplary embodiment, when the Hall effect sensor 74 detects at least one of a magnitude and a direction of the magnetic field of the magnet 96 that is at or near the second magnitude and the second direction of the magnetic field of the magnet 96, the detected magnitude and/or the detected direction are/is above the threshold and the magnet assembly 92 is in the second downstream magnet position (see FIG. 6b).

In the illustrated embodiments, the flow switch 84 includes the Hall effect sensor 74. However, one of ordinary skill in the art will appreciate that the flow switch 84 could include any type of sensor that is operable to be mounted in proximity to the magnet assembly 92 (and, thus, the magnet 96) and to detect at least one of the magnitude and the direction of the magnetic field of the magnet 96. In an exemplary embodiment, another magnetic field sensor, such as a tunnel magnetoresistance ("TMR") sensor, could be used.

In the illustrated embodiments, as best shown in FIGS. 4b-6c, the components of the flow switch 84 are inserted and mounted in locations where together they can detect whether water is flowing through the mechanical mixed water line 30m (and, thus, whether the mechanical valve 32 is activated).

In the illustrated embodiment, components of the flow switch 84 are located partially in the mechanical mixed water passage 60 and partially in the combined mixed water passage 64 in the mixed water tee 40. More particularly, in the illustrated embodiment, the body 86 and the shaft 88 are located in the mechanical mixed water passage 60, and the magnet assembly 92 is located partially in the mechanical mixed water passage 60 and partially in the combined mixed water passage 64 in the mixed water tee 40.

In an exemplary embodiment, the Hall effect sensor 74 is mounted on the PCB 70 in proximity to where the magnet assembly 92 (and, thus, the magnet 96) is located. In the illustrated embodiment, the Hall effect sensor 74 is mounted on the PCB 70 in proximity to an outer surface of the combined mixed water passage 64 in the mixed water tee 40. In other exemplary embodiments, the Hall effect sensor 74 can be mounted in any location in proximity to the magnet assembly 92 (and, thus, the magnet 96) so long as the Hall effect sensor 74 is operable to detect at least one of a magnitude and a direction of the magnetic field of the magnet 96 when the magnet assembly 92 is in the first upstream magnet position and the second downstream magnet position. Exemplary alternative locations for mounting the Hall effect sensor 74 are illustrated by a dotted line 98 in FIG. 5b. Although all the illustrated embodiments of the locations for mounting the Hall effect sensor 74 are outside the flow path of the water, one of ordinary skill in the art will appreciate that the Hall effect sensor 74 could be located in the flow path of the water.

In the illustrated embodiments, the Hall effect sensor 74 is mounted closer to the magnet assembly 92 (and, thus, the magnet 96) when the magnet assembly 92 is in the second downstream magnet position than when the magnet assembly 92 is in the first upstream magnet position. As a result, the second magnitude and the second direction of the magnetic field of the magnet 96 when the magnet assembly 92 is in the second downstream magnet position are greater than the first magnitude and the first direction of the magnetic field of the magnet 96 when the magnet assembly 92 is in the first upstream magnet position. However, one of ordinary skill in the art will appreciate that the Hall effect sensor 74 could be mounted closer to the magnet assembly 92 (and, thus, the magnet 96) when the magnet assembly is in the first upstream magnet position than when the magnet assembly 92 is in the second upstream magnet position. As a result, the first magnitude and the first direction of the magnetic field of the magnet 96 when the magnet assembly 92 is in the first upstream magnet position would be greater than the second magnitude and the second direction of the magnetic field of the magnet 96 when the magnet assembly 92 is in the second upstream magnet position.

In the illustrated embodiments, as best shown in FIGS. 3c and 6c, when water is not flowing through the mechanical mixed water line 30m (and, more particularly, through the mechanical mixed water passage 60 in which the flow switch 84 is at least partially located), the magnet assembly 92 is located in the first upstream magnet position and the Hall effect sensor 74 detects at least one of a magnitude and a direction of the magnetic field of the magnet 96 that is at or near the first magnitude and the first direction of the magnetic field of the magnet 96 (see FIGS. 6a and 6c). The Hall effect sensor 74 sends an appropriate signal to the processor 72, and the processor 72 determines that water is not flowing through the mechanical mixed water line 30m (and, more particularly, through the mechanical mixed water passage 60 in which the flow switch 84 is at least partially located). Thus, the processor 72 determines that the mechanical valve 32 is deactivated.

In the illustrated embodiments, as best shown in FIGS. 3b and 6b, when water starts flowing through the mechanical mixed water line 30*m* (and, more particularly, through the mechanical mixed water passage 60 in which the flow switch 84 is at least partially located), the magnet assembly 92 moves to the second downstream magnet position and the Hall effect sensor 74 detects at least one of a magnitude and a direction of the magnetic field of the magnet 96 that is at or near the second magnitude and the second direction of the magnetic field of the magnet 96 (see FIG. 6*b*). The Hall effect sensor 74 sends an appropriate signal to the processor 72, and the processor 72 determines that water is flowing through the mechanical mixed water line 30*m* (and, more particularly, through the mechanical mixed water passage 60 in which the flow switch 84 is at least partially located). Thus, the processor 72 determines that the mechanical valve 32 is activated.

In the illustrated embodiments, as best shown in FIGS. 3*b* and 6*b*, while water is flowing through the mechanical mixed water line 30*m* (and, more particularly, through the mechanical mixed water passage 60 in which the flow switch 84 is at least partially located), the magnet assembly 92 stays in the second downstream magnet position and the Hall effect sensor 74 continues to detect at least one of the magnitude and the direction of the magnetic field of the magnet 96 that is at or near the second magnitude and the second direction of the magnetic field of the magnet 96 (see FIG. 6*b*). The Hall effect sensor 74 sends an appropriate signal to the processor 72, and the processor 72 determines that water is still flowing through the mechanical mixed water line 30*m* (and, more particularly, through the mechanical mixed water passage 60 in which the flow switch 84 is at least partially located). Thus, the processor 72 determines that the mechanical valve 32 is activated.

In the illustrated embodiments, as best shown in FIGS. 3*c* and 6*c*, when water stops flowing through the mechanical mixed water line 30*m* (and, more particularly, through the mechanical mixed water passage 60 in which the flow switch 84 is at least partially located), the magnet assembly 92 moves back to the first upstream magnet position and the Hall effect sensor 74 detects at least one of the magnitude and the direction of the magnetic field of the magnet 96 that is at or near the first magnitude and the first direction of the magnetic field of the magnet 96 (see FIGS. 6*a* and 6*c*). The Hall effect sensor 74 sends an appropriate signal to the processor 72, and the processor 72 determines that water is not flowing through the mechanical mixed water line 30*m* (and, more particularly, through the mechanical mixed water passage 60 in which the flow switch 84 is at least partially located). Thus, the processor 72 determines that the mechanical valve 32 is deactivated.

In the exemplary embodiment where the power module includes battery power, steps can be taken to conserve battery power. For example, the Hall effect sensor 74 could only be powered (and, thus, could only detect the magnitude and the direction of the magnetic field of the magnet 96) during times when the faucet 12 receives voice input from a user to activate, deactivate, or control the electronic valve 34. The Hall effect sensor 74 could not be powered (and, thus, could not detect the magnitude and the direction of the magnetic field of the magnet 96) during times when the faucet 12 has not received voice input from the user to activate, deactivate, or control the electronic valve 34.

During operation of the mechanical valve 32, the user activates and deactivates the mechanical valve 32 using the handle 22. When the user manually moves the handle 22 to an open position, the mechanical valve 32 is activated. While the mechanical valve 32 is activated, the faucet 12 operates as a standard faucet. As with standard faucets, the user can control the volume and temperature of the flowing water by further manually moving the handle 22 in the open position. Additionally, while the mechanical valve 32 is activated, the electronic valve 34 cannot be activated by the user. This can be accomplished by preventing the electronic valve 34 from opening. When the user manually moves the handle 22 to a closed position, the mechanical valve 32 is deactivated. While the mechanical valve 32 is deactivated, the electronic valve 34 can be activated, deactivated, and controlled.

In an electronic faucet with voice control retrofitted from a mechanical faucet, knowing when the mechanical valve is activated provides improved operation of the electronic faucet. For example, if the mechanical valve is activated, but a user is trying to control the electronic faucet using the voice control, the faucet will not operate as expected by the user. If the electronic faucet knows when the mechanical valve is activated, the electronic faucet can not permit the electronic valve to be activated while the mechanical valve is activated. Additionally, the electronic faucet can notify the user that the mechanical valve is open and instruct them to close the mechanical valve if they desire to activate the electronic valve.

During operation of the electronic valve 34, the user activates, deactivates, and controls the electronic valve 34 using the voice module 44. When the user appropriately triggers the voice module 44, the electronic valve is activated, deactivated, or otherwise controlled. The user can trigger the voice module 44 by stating specific commands. For example, when the user says "turn on the faucet," the electronic valve 34 is activated. Similarly, when the user says "turn off the faucet," the electronic valve 34 is deactivated. Further, when the user says "increase temperature," "decrease temperature," "increase flow," or "decrease flow," the electronic valve 34 is controlled to accomplish the requested action. The commands can be predetermined. Additionally, the commands can be customizable. For example, the user could activate the electronic valve 34 by saying "start flow" instead of "turn on the faucet." Similarly, the user could deactivate the electronic valve 34 by saying "stop flow" instead of "turn off the faucet."

As used herein, "activate a valve" means to move the valve to or maintain the valve in an open position, regardless of the volume or temperature of the flowing water, and "deactivate a valve" means to move the valve to a completely closed position.

When reference is made to activating or deactivating the electronic valve 34 "when the user appropriately triggers the voice module 44," the electronic valve 34 may be activated or deactivated immediately upon the voice module 44 being triggered or a predetermined period of time after the voice module 44 has been triggered.

One of ordinary skill in the art will now appreciate that the present invention provides an electronic plumbing fixture fitting, such as an electronic faucet, including a mechanical valve, an electronic valve, and a flow switch, where the flow switch is used to determine if the mechanical valve is activated and to control activation of the electronic valve based on that determination. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
a discharge outlet, the discharge outlet operable to deliver water;
a mechanical valve, the mechanical valve operable to permit flow of water through the discharge outlet when the mechanical valve is activated and to not permit flow of water through the discharge outlet when the mechanical valve is deactivated;
a mechanical hot water line, the mechanical hot water line operable to deliver hot water to the mechanical valve;
a mechanical cold water line, the mechanical cold water line operable to deliver cold water to the mechanical valve;
a mechanical mixed water line, the mechanical mixed water line operable to receive mixed water from the mechanical valve;
an electronic valve, the mechanical valve being in parallel with the electronic valve, the electronic valve operable to permit flow of water through the discharge outlet when the electronic valve is activated and to not permit flow of water through the discharge outlet when the electronic valve is deactivated;
an electronic hot water line, the electronic hot water line operable to deliver hot water to the electronic valve;
an electronic cold water line, the electronic cold water line operable to deliver cold water to the electronic valve;
an electronic mixed water line, the electronic mixed water line operable to receive mixed water from the electronic valve;
a combined mixed water line, the combined mixed water line operable to receive mixed water from the mechanical mixed water line and mixed water from the electronic mixed water line;
a control module, the control module operable to mount below a mounting surface, the mechanical valve being located outside the control module, and the electronic valve being located inside the control module; and
a flow switch, the flow switch being located inside the control module, the flow switch operable to be inserted at least partially in the mechanical mixed water line, the flow switch including:
a body, the body operable to be inserted at least partially in the mechanical mixed water line, the body including an opening extending therethrough, the body including a longitudinal axis extending therethrough;
a shaft, the shaft operable to be inserted in the opening of the body, the shaft operable to move in the opening of the body along the longitudinal axis of the body from a first upstream shaft position to a second downstream shaft position, when water is not flowing through the mechanical mixed water line, the shaft is in the first upstream shaft position, when water is flowing through the mechanical mixed water line, the shaft is in the second downstream shaft position, the shaft including an upstream end and a downstream end;
a magnet assembly, the magnet assembly operable to be attached to the downstream end of the shaft, the magnet assembly operable to move with the shaft from a first upstream magnet position to a second downstream magnet position, when water is not flowing through the mechanical mixed water line, the magnet assembly is in the first upstream magnet position, when water is flowing through the mechanical mixed water line, the magnet assembly is in the second downstream magnet position, the magnet assembly including a magnet having a magnetic field, the magnetic field having a magnitude and a direction; and
a sensor, the sensor operable to be mounted in proximity to the magnet assembly, the sensor operable to detect at least one of the magnitude and the direction of the magnetic field of the magnet, when the magnet assembly is in the first upstream magnet position, the sensor operable to detect at least one of a first magnitude and a first direction of the magnetic field of the magnet, when the magnet assembly is in the second downstream magnet position, the sensor operable to detect at least one of a second magnitude and a second direction of the magnetic field of the magnet;
wherein, when water is not flowing through the mechanical mixed water line, the magnet assembly is located in the first upstream magnet position, the sensor detects at least one of a magnitude and a direction of the magnetic field of the magnet that is at or near the first magnitude and the first direction of the magnetic field of the magnet, a determination can be made that water is not flowing through the mechanical mixed water line, the electronic valve can be activated, and water is permitted to flow through the electronic mixed water line;
wherein, when water starts flowing through the mechanical mixed water line, the magnet assembly moves to the second downstream magnet position, the sensor detects at least one of a magnitude and a direction of the magnetic field of the magnet that is at or near the second magnitude and the second direction of the magnetic field of the magnet, a determination can be made that water is flowing through the mechanical mixed water line, the electronic valve cannot be activated, and water is not permitted to flow through the electronic mixed water line;
wherein, while water is flowing through the mechanical mixed water line, the magnet assembly stays in the second downstream magnet position, the sensor detects at least one of the magnitude and the direction of the magnetic field of the magnet that is at or near the second magnitude and the second direction of the magnetic field of the magnet, the determination can be made that water is flowing through the mechanical mixed water line, the electronic valve cannot be activated, and water is not permitted to flow through the electronic mixed water line; and
wherein, when water stops flowing through the mechanical mixed water line, the magnet assembly moves to the first upstream magnet position, the sensor detects at least one of the magnitude and the direction of the magnetic field of the magnet that is at or near the first magnitude and the first direction of the magnetic field of the magnet, the determination can be made that water is not flowing through the mechanical mixed water line, the electronic valve can be activated, and water is permitted to flow through the electronic mixed water line.

2. The electronic plumbing fixture fitting of claim 1, wherein the shaft is operable to move solely along the longitudinal axis of the body.

3. The electronic plumbing fixture fitting of claim 1, wherein the magnet assembly includes a single magnet.

4. The electronic plumbing fixture fitting of claim 1, wherein, while water is flowing through the mechanical mixed water line, the magnet assembly stays in the second downstream magnet position through pressure of the flowing water.

5. The electronic plumbing fixture fitting of claim 1, further including a spring surrounding the shaft, and, wherein, when water stops flowing through the mechanical mixed water line, the magnet assembly moves to the first upstream magnet position through force from the spring.

6. The electronic plumbing fixture fitting of claim 1, wherein the sensor is mounted closer to the magnet assembly when the magnet assembly is in the second downstream magnet position than when the magnet assembly is in the first upstream magnet position.

7. The electronic plumbing fixture fitting of claim 1, further including a voice module, and wherein the electronic valve is controlled through voice input to the voice module, wherein the electronic valve can be voice activated when the mechanical valve is not activated, and wherein the electronic valve cannot be voice activated when the mechanical valve is activated.

8. An electronic plumbing fixture fitting, comprising:
   a discharge outlet, the discharge outlet operable to deliver water;
   a mechanical valve, the mechanical valve operable to permit flow of water through the discharge outlet when the mechanical valve is activated and to not permit flow of water through the discharge outlet when the mechanical valve is deactivated;
   a mechanical hot water line, the mechanical hot water line operable to deliver hot water to the mechanical valve;
   a mechanical cold water line, the mechanical cold water line operable to deliver cold water to the mechanical valve;
   a mechanical mixed water line, the mechanical mixed water line operable to receive mixed water from the mechanical valve;
   an electronic valve, the mechanical valve being in parallel with the electronic valve, the electronic valve operable to permit flow of water through the discharge outlet when the electronic valve is activated and to not permit flow of water through the discharge outlet when the electronic valve is deactivated;
   an electronic hot water line, the electronic hot water line operable to deliver hot water to the electronic valve;
   an electronic cold water line, the electronic cold water line operable to deliver cold water to the electronic valve;
   an electronic mixed water line, the electronic mixed water line operable to receive mixed water from the electronic valve;
   a combined mixed water line, the combined mixed water line operable to receive mixed water from the mechanical mixed water line and mixed water from the electronic mixed water line;
   a control module, the control module operable to mount below a mounting surface, the mechanical valve being located outside the control module, the electronic valve being located inside the control module, the control module including a mixed water inlet and a mixed water outlet, the mixed water inlet operable to receive mixed water from the mechanical mixed water line, the mixed water outlet operable to deliver mixed water to the combined mixed water line, the mixed water inlet and the mixed water outlet being parallel; and
   a flow switch, the flow switch being located inside the control module, the flow switch operable to be inserted at least partially in the mechanical mixed water line, the flow switch including:
   a body, the body operable to be inserted at least partially in the mechanical mixed water line, the body including an opening extending therethrough, the body including a longitudinal axis extending therethrough;
   a shaft, the shaft operable to be inserted in the opening of the body, the shaft operable to move in the opening of the body along the longitudinal axis of the body from a first upstream shaft position to a second downstream shaft position, when water is not flowing through the mechanical mixed water line, the shaft is in the first upstream shaft position, when water is flowing through the mechanical mixed water line, the shaft is in the second downstream shaft position, the shaft including an upstream end and a downstream end;
   a magnet assembly, the magnet assembly operable to be attached to the downstream end of the shaft, the magnet assembly operable to move with the shaft from a first upstream magnet position to a second downstream magnet position, when water is not flowing through the mechanical mixed water line, the magnet assembly is in the first upstream magnet position, when water is flowing through the mechanical mixed water line, the magnet assembly is in the second downstream magnet position, the magnet assembly including a magnet having a magnetic field, the magnetic field having a magnitude and a direction; and
   a sensor, the sensor operable to be mounted in proximity to the magnet assembly, the sensor operable to detect at least one of the magnitude and the direction of the magnetic field of the magnet, when the magnet assembly is in the first upstream magnet position, the sensor operable to detect at least one of a first magnitude and a first direction of the magnetic field of the magnet, when the magnet assembly is in the second downstream magnet position, the sensor operable to detect at least one of a second magnitude and a second direction of the magnetic field of the magnet;
   wherein, when water is not flowing through the mechanical mixed water line, the magnet assembly is located in the first upstream magnet position, the sensor detects at least one of a magnitude and a direction of the magnetic field of the magnet that is at or near the first magnitude and the first direction of the magnetic field of the magnet, a determination can be made that water is not flowing through the mechanical mixed water line, the electronic valve can be activated, and water is permitted to flow through the electronic mixed water line;
   wherein, when water starts flowing through the mechanical mixed water line, the magnet assembly moves to the second downstream magnet position, the sensor detects at least one of a magnitude and a direction of the magnetic field of the magnet that is at or near the second magnitude and the second direction of the magnetic field of the magnet, a determination can be made that water is flowing through the mechanical mixed water line, the electronic valve cannot be activated, and water is not permitted to flow through the electronic mixed water line;
   wherein, while water is flowing through the mechanical mixed water line, the magnet assembly stays in the second downstream magnet position, the sensor detects at least one of the magnitude and the direction of the magnetic field of the magnet that is at or near the second magnitude and the second direction of the magnetic field of the magnet, the determination can be made that water is flowing through the mechanical mixed water line, the electronic valve cannot be activated, and water is not permitted to flow through the electronic mixed water line; and wherein, when water stops flowing through the mechanical mixed water line, the magnet assembly moves to the first upstream magnet position, the sensor detects at least one of the magnitude and the direction of the magnetic field of the magnet that is at or near the first magnitude and the first direction of the magnetic field of the magnet, the determination can be made that water is not flowing through the mechanical mixed water line, the electronic valve can be activated, and water is permitted to flow through the electronic mixed water line.

9. The electronic plumbing fixture fitting of claim 8, wherein the shaft is operable to move solely along the longitudinal axis of the body.

10. The electronic plumbing fixture fitting of claim 8, wherein the magnet assembly includes a single magnet.

11. The electronic plumbing fixture fitting of claim 8, wherein, while water is flowing through the mechanical mixed water line, the magnet assembly stays in the second downstream magnet position through pressure of the flowing water.

12. The electronic plumbing fixture fitting of claim 8, further including a spring surrounding the shaft, and, wherein, when water stops flowing through the mechanical mixed water line, the magnet assembly moves to the first upstream magnet position through force from the spring.

13. The electronic plumbing fixture fitting of claim 8, wherein the sensor is mounted closer to the magnet assembly when the magnet assembly is in the second downstream magnet position than when the magnet assembly is in the first upstream magnet position.

14. The electronic plumbing fixture fitting of claim 8, further including a voice module, and wherein the electronic valve is controlled through voice input to the voice module, wherein the electronic valve can be voice activated when the mechanical valve is not activated, and wherein the electronic valve cannot be voice activated when the mechanical valve is activated.

15. An electronic plumbing fixture fitting, comprising:
a faucet, the faucet operable to mount above a mounting surface, the faucet including a hub and a discharge outlet, the discharge outlet operable to deliver water;
a mechanical valve, the mechanical valve being located inside the hub of the faucet, the mechanical valve operable to permit flow of water through the discharge outlet when the mechanical valve is activated and to not permit flow of water through the discharge outlet when the mechanical valve is deactivated;
a mechanical hot water line, the mechanical hot water line operable to deliver hot water to the mechanical valve;
a mechanical cold water line, the mechanical cold water line operable to deliver cold water to the mechanical valve;
a mechanical mixed water line, the mechanical mixed water line operable to receive mixed water from the mechanical valve;
an electronic valve, the mechanical valve being in parallel with the electronic valve, the electronic valve operable to permit flow of water through the discharge outlet when the electronic valve is activated and to not permit flow of water through the discharge outlet when the electronic valve is deactivated;
an electronic hot water line, the electronic hot water line operable to deliver hot water to the electronic valve;
an electronic cold water line, the electronic cold water line operable to deliver cold water to the electronic valve;
an electronic mixed water line, the electronic mixed water line operable to receive mixed water from the electronic valve;
a combined mixed water line, the combined mixed water line operable to receive mixed water from the mechanical mixed water line and mixed water from the electronic mixed water line;
a control module, the control module operable to mount below the mounting surface, the electronic valve being located inside the control module; and
a flow switch, the flow switch being located inside the control module, the flow switch operable to be inserted at least partially in the mechanical mixed water line, the flow switch including:
a body, the body operable to be inserted at least partially in the mechanical mixed water line, the body including an opening extending therethrough, the body including a longitudinal axis extending therethrough;
a shaft, the shaft operable to be inserted in the opening of the body, the shaft operable to move in the opening of the body along the longitudinal axis of the body from a first upstream shaft position to a second downstream shaft position, when water is not flowing through the mechanical mixed water line, the shaft is in the first upstream shaft position, when water is flowing through the mechanical mixed water line, the shaft is in the second downstream shaft position, the shaft including an upstream end and a downstream end;
a magnet assembly, the magnet assembly operable to be attached to the downstream end of the shaft, the magnet assembly operable to move with the shaft from a first upstream magnet position to a second downstream magnet position, when water is not flowing through the mechanical mixed water line, the magnet assembly is in the first upstream magnet position, when water is flowing through the mechanical mixed water line, the magnet assembly is in the second downstream magnet position, the magnet assembly including a magnet having a magnetic field, the magnetic field having a magnitude and a direction; and
a sensor, the sensor operable to be mounted in proximity to the magnet assembly, the sensor operable to detect at least one of the magnitude and the direction of the magnetic field of the magnet, when the magnet assembly is in the first upstream magnet position, the sensor operable to detect at least one of a first magnitude and a first direction of the magnetic field of the magnet, when the magnet assembly is in the second downstream magnet position, the sensor operable to detect at least one of a second magnitude and a second direction of the magnetic field of the magnet;
wherein, when water is not flowing through the mechanical mixed water line, the magnet assembly is located in the first upstream magnet position, the sensor detects at least one of a magnitude and a direction of the magnetic field of the magnet that is at or near the first magnitude and the first direction of the magnetic field of the magnet, a determination can be made that water is not flowing through the mechanical mixed water line, the electronic valve can be activated, and water is permitted to flow through the electronic mixed water line;

wherein, when water starts flowing through the mechanical mixed water line, the magnet assembly moves to the second downstream magnet position, the sensor detects at least one of a magnitude and a direction of the magnetic field of the magnet that is at or near the second magnitude and the second direction of the magnetic field of the magnet, a determination can be made that water is flowing through the mechanical mixed water line, the electronic valve cannot be activated, and water is not permitted to flow through the electronic mixed water line;

wherein, while water is flowing through the mechanical mixed water line, the magnet assembly stays in the second downstream magnet position, the sensor detects at least one of the magnitude and the direction of the magnetic field of the magnet that is at or near the second magnitude and the second direction of the magnetic field of the magnet, the determination can be made that water is flowing through the mechanical mixed water line, the electronic valve cannot be activated, and water is not permitted to flow through the electronic mixed water line; and wherein, when water stops flowing through the mechanical mixed water line, the magnet assembly moves to the first upstream magnet position, the sensor detects at least one of the magnitude and the direction of the magnetic field of the magnet that is at or near the first magnitude and the first direction of the magnetic field of the magnet, the determination can be made that water is not flowing through the mechanical mixed water line, the electronic valve can be activated, and water is permitted to flow through the electronic mixed water line.

16. The electronic plumbing fixture fitting of claim 15, wherein the shaft is operable to move solely along the longitudinal axis of the body.

17. The electronic plumbing fixture fitting of claim 15, wherein the magnet assembly includes a single magnet.

18. The electronic plumbing fixture fitting of claim 15, wherein, while water is flowing through the mechanical mixed water line, the magnet assembly stays in the second downstream magnet position through pressure of the flowing water.

19. The electronic plumbing fixture fitting of claim 15, further including a spring surrounding the shaft, and, wherein, when water stops flowing through the mechanical mixed water line, the magnet assembly moves to the first upstream magnet position through force from the spring.

20. The electronic plumbing fixture fitting of claim 15, wherein the sensor is mounted closer to the magnet assembly when the magnet assembly is in the second downstream magnet position than when the magnet assembly is in the first upstream magnet position.

* * * * *